United States Patent [19]

Hasson et al.

[11] Patent Number: 5,075,861
[45] Date of Patent: Dec. 24, 1991

[54] INTEGRATED STABILIZED OPTICAL AND NAVIGATION SYSTEM

[75] Inventors: Joseph Hasson, Neve Monoson; Eli Ben Aharon, Ra'anana, both of Israel

[73] Assignee: Israel Aircraft Industries Ltd., Israel

[21] Appl. No.: 378,142

[22] Filed: Jul. 11, 1989

[30] Foreign Application Priority Data

Jul. 18, 1988 [IL] Israel .................................... 87151

[51] Int. Cl.[5] ............ B64C 17/02; B64C 17/06; G01C 21/00; G01F 15/48
[52] U.S. Cl. .......................... 364/453; 318/648; 318/649; 364/434; 364/443
[58] Field of Search ............... 364/424.01, 424.02, 364/434, 443, 449, 453–456, 459, 460; 318/649, 648

[56] References Cited

U.S. PATENT DOCUMENTS

| 3,310,876 | 3/1967 | Yamron | 364/453 X |
| 3,491,228 | 7/1968 | Selvin | 364/434 |
| 3,844,196 | 10/1974 | Taylor et al. | 318/649 X |
| 4,166,406 | 9/1979 | Maughmer | 364/434 X |
| 4,318,300 | 3/1982 | Maughmer | 364/453 X |
| 4,621,329 | 11/1986 | Jacob | 364/455 |

FOREIGN PATENT DOCUMENTS

| 2033871 | 11/1979 | Netherlands | 318/649 |
| 1524153 | 9/1978 | United Kingdom | 318/649 |

Primary Examiner—Parshotam S. Lall
Assistant Examiner—E. J. Pipala
Attorney, Agent, or Firm—Amster, Rothstein & Ebenstein

[57] ABSTRACT

An integrated stabilized optical and navigation system comprising a gimballed platform, acceleration and velocity sensors associated with the gimballed platform, platform positioning apparatus responsive to outputs of the acceleration and velocity sensors for maintaining a desired orientation of the gimballed platform and a navigation computer being responsive to the outputs of the acceleration and velocity sensors for providing an output indication of location.

6 Claims, 4 Drawing Sheets

5,075,861

INTEGRATED STABILIZED OPTICAL AND NAVIGATION SYSTEM

FIELD OF THE INVENTION

The present invention relates to optical gimballed stabilized platforms generally.

BACKGROUND OF THE INVENTION

Gimballed platforms are well known in the art for navigation. They are also used in stabilized systems, such as stabilized line of sight, mobile fire control and surveillance systems. Examples of the use of gimballed platforms in the two separate systems appear, inter alia, in the following systems:

SLOS (Stabilized Line of Sight System) commercially available from the TAMAM division of Israel Aircraft Industries and described in the following catalog: TM -181.

DSP (Day Surveillance Payload) commercially available from the TAMAM division of Israel Aircraft Industries and described in the following catalog: TM -510 of February, 1986.

SUMMARY OF THE INVENTION

The present invention seeks to provide an integrated navigation and stabilized optical system which employs a common gimballed platform and associated sensors and thus is significantly smaller, lighter and less expensive to manufacture and employ than conventional separate navigation and stabilized optical systems.

There is thus provided in accordance with a preferred embodiment of the present invention an integrated stabilized optical and navigation system comprising a gimballed platform, acceleration and velocity sensors associated with the gimballed platform, platform positioning apparatus responsive to outputs of the acceleration and velocity sensors for maintaining a desired orientation of the gimballed platform and a navigation computer being responsive to the outputs of the acceleration and velocity sensors for providing an output indication of location.

Further in accordance with a preferred embodiment of the present invention the acceleration and velocity sensors are in the form of a strapdown inertial measurement unit.

In accordance with one preferred embodiment of the invention the gimballed platform defines a mirror in a stabilized line of sight system. According to an alternative embodiment of the invention, the gimballed platform defines a support for imaging apparatus such as a FLIR or a TV camera.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
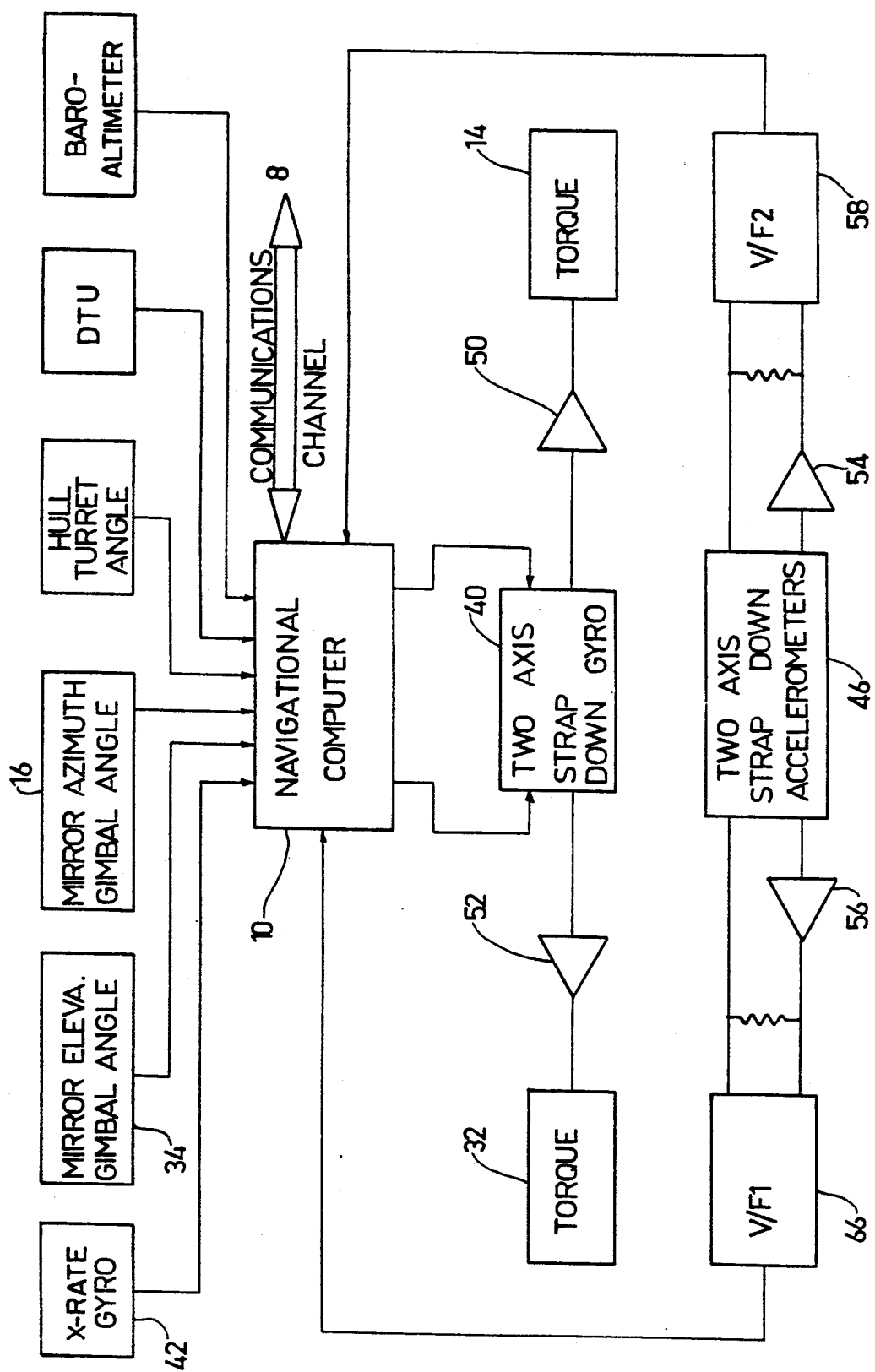
FIG. 1 is a block diagram illustration of an integrated stabilized optical and navigation system constructed and operative in accordance with a preferred embodiment of the present invention and particularly configured as part of a tank fire control system.
Figure 2:
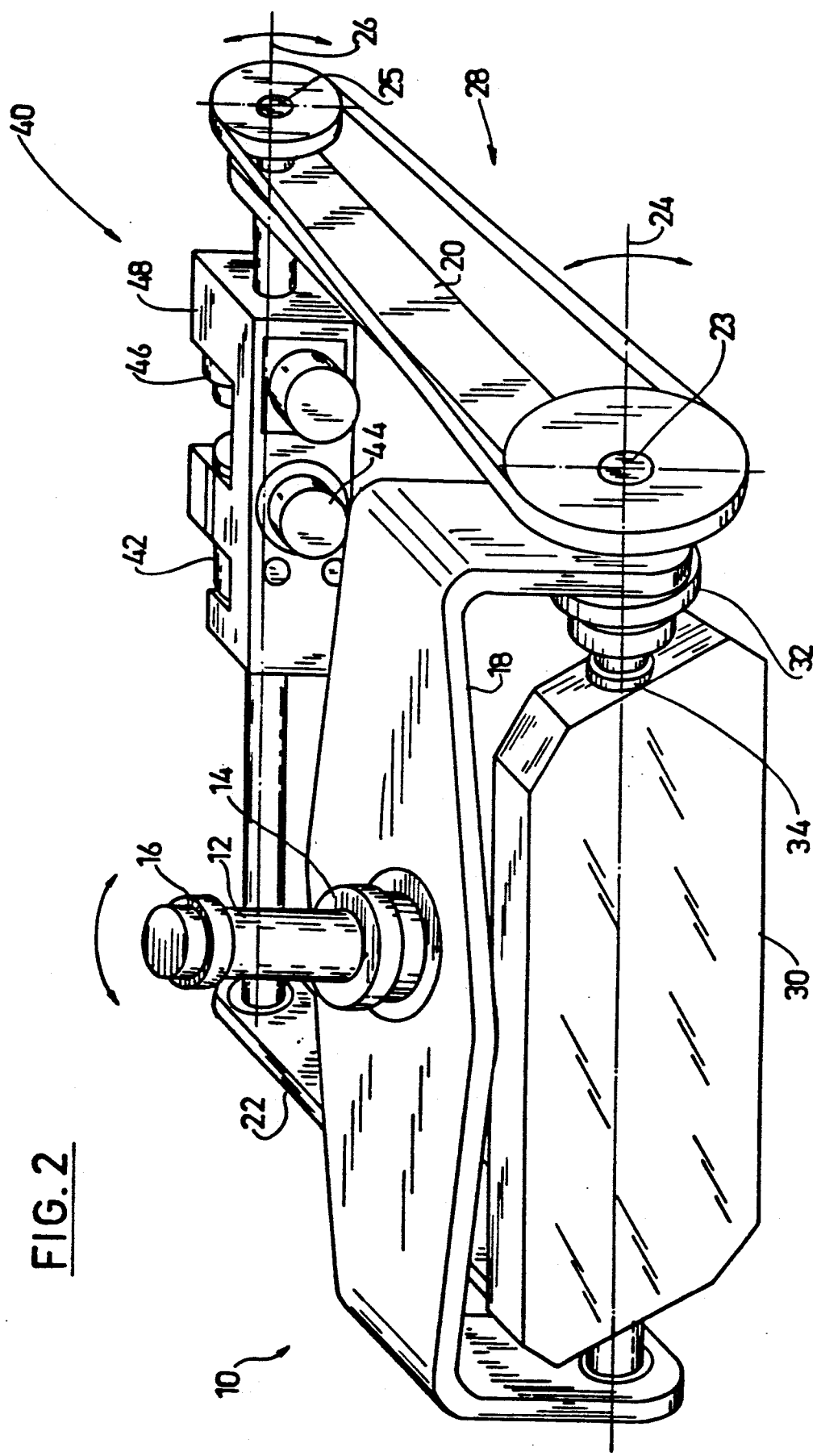
FIG. 2 is a pictorial illustration of part of an integrated stabilized optical and navigation system comprising a stabilized optical line of sight device and navigation system constructed and operative in accordance with a preferred embodiment of the present invention and particularly configured as part of a tank fire control system.

Reference is now made to FIGS. 1 and 2, which illustrate an integrated stabilized optical and navigation system constructed and operative in accordance with a preferred embodiment of the present invention and particularly configured for providing fire control in tanks.

The mechanical apparatus is shown principally in FIG. 2 and includes an azimuthal gimbal 10 which is mounted via a mounting shaft 12, which defines the nominal Z-axis, onto a platform, such as a tank turret, (not shown). The angular orientation of the gimbal 10 about shaft 12 is determined by a torquer 14, such as Part No. 2375-038 commercially available from Magnetic Technology Division of Vernitron Corporation, of Canoga Park, Cal., U.S.A., and an output indication of the angular orientation is provided by a Synchro 16, such as Part No. VSP20-6 commercially available from Vernitron Control Components Division of Vernitron Corporation of San Diego, Cal., U.S.A..

Azimuth gimbal 10 defines a cross piece 18 and a pair of parallel arms 20 and 22, Rotatably mounted onto the two arms are a pair of gimballed shafts 23 and 25 arranged along parallel axes, nominally X-axes 24 and 26. Shafts 23 and 25 are interconnected by a belt transmission 28 having a desired transmission ratio, here 2:1 as illustrated.

Arranged for desired rotational orientation along axis 24 and mounted on gimballed shaft 23 is a mirror 30 which provides a stabilized line of sight for a desired optical system (not shown) operatively associated therewith, which optical system is rigidly connected to shaft 12. A torquer 32 determines the mirror orientation about axis 24, while a synchro 34 provides an output indication of that angular orientation.

A sensor block 40 is mounted onto gimballed shaft 25 and typically comprises an X-rate gyroscope 42, such as Part No. 2417 commercially available from TAMAM division of Israel Aircraft Industries, pitch and yaw accelerometers 44 and 46, an additional two degree of freedom gyroscope 48, such as a TAMAM Minitune gyroscope available from TAMAM Division of Israel Aircraft Industries of Lod, Israel, under Part No. 574.

Turning now additionally to FIG. 1, it is seen that a navigational computer 10, such as one based on an Intel 80386 microprocessor, which is not seen in FIG. 2, receives the following inputs:

An indication of the inertial angular velocity about the x-axis of sensor block 40 from X-rate gyroscope 42;

An indication of the mirror elevation gimbal angle from synchro 34;

An indication of the mirror azimuth gimbal angle from synchro 16, representing the angle between the azimuth gimbal and the turret;

An indication of the Hull-Turret angle from a sensor not shown.

An indication of the distance traveled by the tank from a distance transmitting unit (not shown) such as a DTU (Distance Transmitting Unit) commercially available from the Tamam division of Israel Aircraft Industries; and An indication of static air pressure and possibly also temperature from instruments (not shown).

The navigation computer communicates via a communications channel 8, such as an RS-422 or MUX BUS 1553B for interaction with operator commands and other systems and displays.

The navigation computer performs strapdown calculations by providing x and y torquer inputs to torquers 14 and 32 via gyro 48 and conventional gyro output electronic amplification circuits 50 and 52. Accelerometers 44 and 46 are responsive to the movements produced by actuation of torquers 14 and 32 to provide output indications of position and torque to the navigation computer via conventional electronic amplification circuits 54 and 56 and precision analog to digital converters 58 and 60 respectively.

It is a particular feature of the present invention that the same torquers and acceleration and position sensors are employed both for providing a stabilized optical platform and for providing inertial navigation.

The operation of the apparatus of FIGS. 1 and 2 for navigation purposes will now be described briefly:

Conventional strapdown calculations are performed as set forth in the following reference: STRAPDOWN INERTIAL NAVIGATION SYSTEMS, AN ALGORITHM FOR ATTITUDE AND NAVIGATION COMPUTATIONS by R. B. Miller, Aeronautical Research Labs. Australia. Information for performing the strapdown calculations is received from gyroscope 42, synchros 16 and 34, accelerometers 44 and 66 and additional gyroscope 48. The strapdown calculations are employed both for providing an output indication of attitude via communication channel 8 and for operating torquers 14 and 32 for correct positioning of mirror 30. Location is calculated by integration of the odometer data projected on the North and East axes using the computed azimuth angle.

Figure 3:
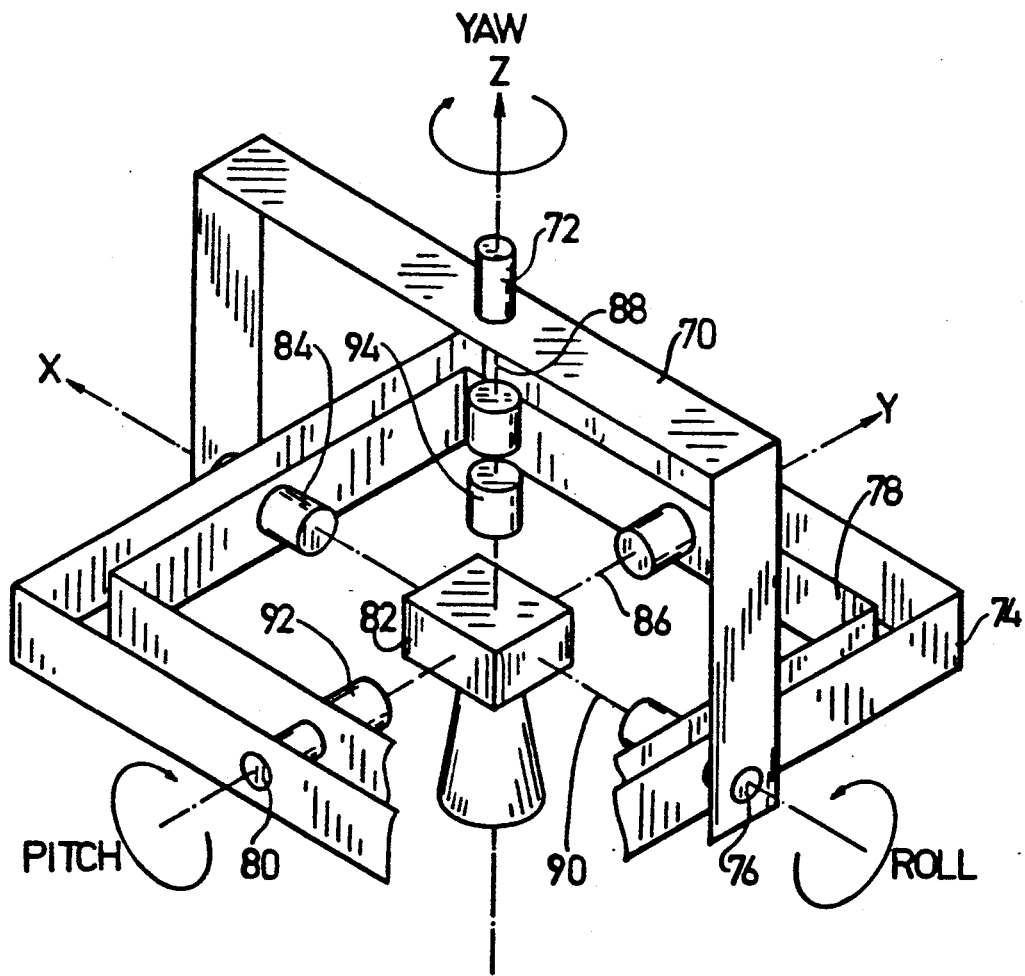
FIG. 3 is a schematic illustration of a part of an integrated stabilized optical and navigation system comprising a stabilized camera platform and navigation system constructed and operative in accordance with another perferred embodiment of the present invention.
Figure 4:
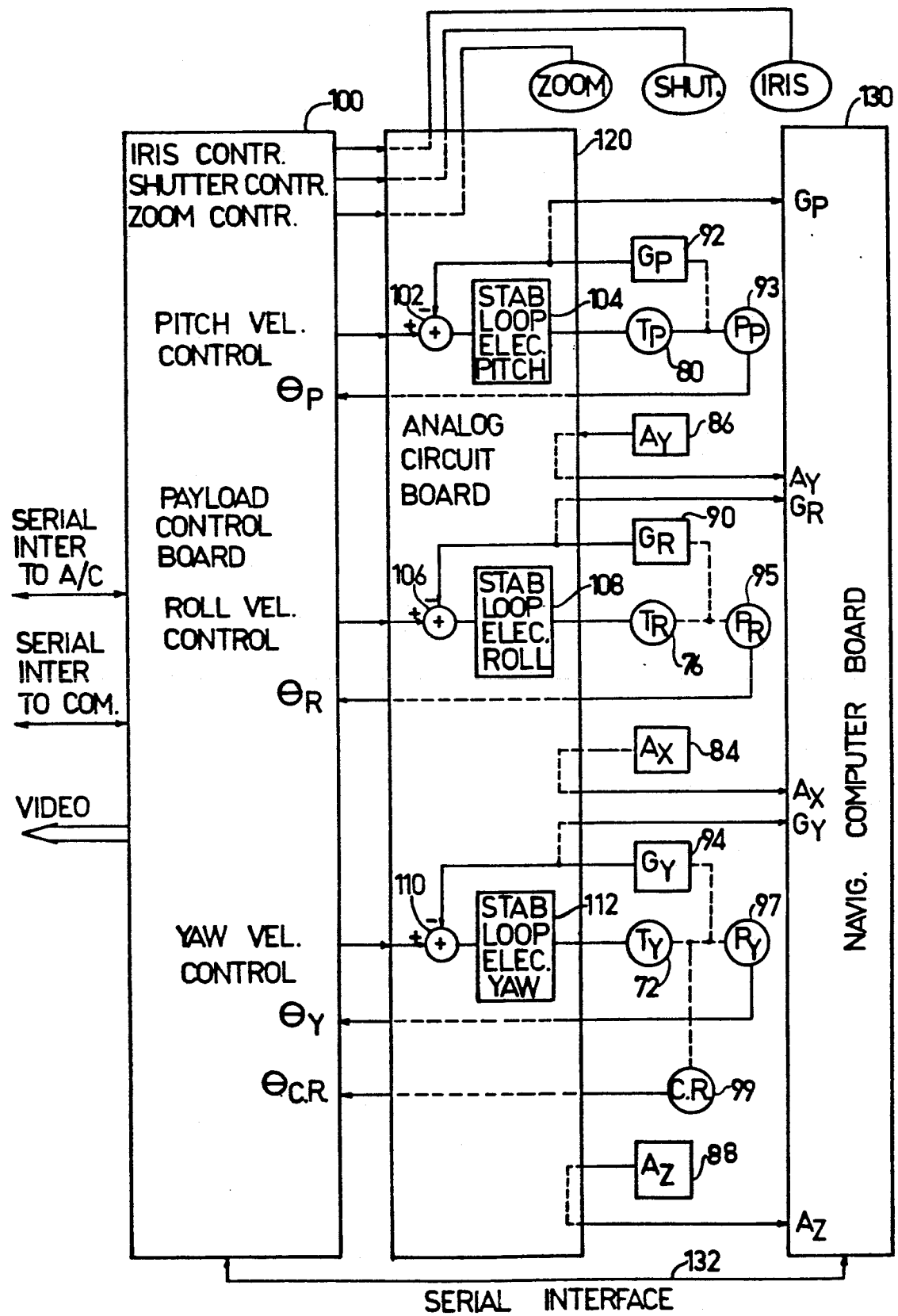
FIG. 4 is a block diagram illustration of the stabilized camera platform and navigation system of FIG. 3.

Reference is now made to FIGS. 3 and 4, which illustrate an integrated stabilized optical and navigation system including a stabilized camera platform in accordance with a preferred embodiment of the present invention. In FIG. 3 there is shown schematically a stabilized platform comprising an outer support 70 which is mounted on a torquer 72 for rotation about the Z-axis. Rotatably mounted on support 70 is an intermediate support 74 which is arranged for selectable rotation about an X axis by a torquer 76. Rotatably mounted on support 74 is a stabilized platform support 78 which is arranged for selectable rotation about a Y-axis by a torquer 80. A camera 82 and zoom optics or any other suitable payload is mounted onto platform 78.

Accelerometers 84, 86 and 88 are arranged along the X, Y and Z axes respectively for measuring the acceleration about those axes. Rate gyroscopes 90, 92 and 94 are arranged along the X, Y and Z axes respectively for measuring rotational displacement along those axes.

Turning now to FIG. 4, there is seen an electrical block diagram illustration of the stabilized optical and navigation system including a stabilized camera platform. A payload control board 100 provides Iris control, shutter control and zoom control outputs to camera 82 (FIG. 3). Control board 100 also provides a pitch velocity control signal via a comparator 102 and a Pitch stabilized loop electrical control 104 to torquer 80. Rate gyroscope 92 provides a feedback input to comparator 102. A pitch pick off 93 provides an output indication of pitch.

Control board 100 also provides a roll velocity control signal via a comparator 106 and a roll stabilized loop electrical control 108 to torquer 76. Rate gyroscope 90 provides a feedback input to comparator 106. A roll pick off 95 provides an output indication of roll.

Control board 100 also provides a yaw velocity control signal via a comparator 110 and a yaw stabilized loop electrical control 112 to torquer 72. Rate gyroscope 94 provides a feedback input to comparator 110. A yaw pick off 97 provides an output indication of yaw.

An analog circuit board 120 includes comparators 102, 106 and 110, as well as stabilized loop circuits 104, 108 and 112.

A coordinate resolver 99 is coupled to torquer 72 and provides a coordinate resolved output to the payload control board. Stabilized loop circuits 104, 108 and 112 typically comprise a compensation network which outputs to a power amplifier.

A navigation computer board 130 typically comprising a Intel ISBC 386/21 receives the outputs of rate gyroscopes 90, 92 and 94 and of accelerometers 84, 86 and 88. Navigation computer board 130 also receives three gimbal angles and mode command information from payload control board via a serial interface 132.

It will be appreciated by persons skilled in the art that the present invention is not limited by what has been particularly shown and described hereinabove. Rather the scope of the invention is defined only by the claims which follow:

We claim:

1. An integrated stabilized optical and navigation system comprising:
   a gimballed platform;
   acceleration and angular velocity sensors associated with the gimballed platform and being used both for stabilization and navigation of the platform;
   platform positioning means responsive to outputs of the acceleration and angular velocity sensors for maintaining a desired orientation of the gimballed platform; and
   a navigation computer responsive to the outputs of said acceleration and angular velocity sensors for providing an output indication of location of said platform .

2. An integrated stabilized optical and navigation system according to claim 1 and wherein said acceleration and velocity sensors are embodied in a strapdown inertial measurement unit.

3. An integrated stabilized optical and navigation system according to claim 1 and wherein said gimballed platform comprises a support for said imaging means.

4. An integrated stabilized optical and navigation system according to claim 2 and wherein said gimballed platform comprises a support for said imaging means .

5. An integrated stabilized optical and navigation system according to claim 1 and wherein said gimballed platform comprises a support for a camera.

6. An integrated stabilized optical and navigation system according to claim 2 and wherein said gimballed platform comprises a support for a camera.

* * * * *